(12) United States Patent
Okada et al.

(10) Patent No.: US 10,975,916 B2
(45) Date of Patent: Apr. 13, 2021

(54) CONNECTING STRUCTURE AND HYDRAULIC DRIVE DEVICE

(71) Applicant: NABTESCO CORPORATION, Tokyo (JP)

(72) Inventors: Isamu Okada, Gifu (JP); Makoto Yoshida, Oshu (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 16/366,361

(22) Filed: Mar. 27, 2019

(65) Prior Publication Data
US 2019/0309798 A1    Oct. 10, 2019

(30) Foreign Application Priority Data
Apr. 4, 2018  (JP) .............................. JP2018-072656

(51) Int. Cl.
*F16D 1/10*          (2006.01)

(52) U.S. Cl.
CPC ........ F16D 1/101 (2013.01); *F16D 2001/102* (2013.01)

(58) Field of Classification Search
CPC ....... F16D 1/101; F16D 2001/102; F16D 1/10
USPC ........................................................... 74/63
See application file for complete search history.

(56) References Cited

U.S. PATENT DOCUMENTS

| | | | |
|---|---|---|---|
| 6,203,238 B1 * | 3/2001 | Otto .................. | F16D 1/033 403/354 |
| 6,375,595 B1 * | 4/2002 | Machida ............. | F16H 15/38 403/354 |
| 6,499,958 B2 * | 12/2002 | Haugen .............. | F04D 29/266 416/204 A |

FOREIGN PATENT DOCUMENTS

JP        10-257815 A       9/1998

* cited by examiner

*Primary Examiner* — William C Joyce
(74) *Attorney, Agent, or Firm* — Pillsbury Winthrop Shaw Pittman, LLP (57) ABSTRACT

Provided are a connecting structure and a hydraulic drive device capable of simply and reliably connecting two shaft bodies together while appropriately preventing rotation and runout therebetween. The connecting structure includes a first shaft body and a second shaft body connected to each other at respective end portions and provided so as to be rotatable integrally with each other about a rotation axis. An anti-runout support portion of the first shaft body and that of the second shaft body are engaged with each other so as to restrict relative movement between the first and second shaft bodies with respect to a radial direction. An anti-rotation support portion of the first shaft body and that of the second shaft body are engaged with each other so as to restrict relative movement between the first and second shaft bodies with respect to a rotation direction about the rotation axis.

17 Claims, 6 Drawing Sheets

CONNECTING STRUCTURE AND HYDRAULIC DRIVE DEVICE

CROSS-REFERENCE TO RELATED APPLICATIONS

This application is based on and claims the benefit of priority from Japanese Patent Application Serial No. 2018-072656 (filed on Apr. 4, 2018), the contents of which are hereby incorporated by reference in their entirety.

TECHNICAL FIELD

The present invention relates to a connecting structure and a hydraulic drive device that include a first shaft body and a second shaft body connected to each other and relates particularly to a technique for restricting relative movement between the first shaft body and the second shaft body.

BACKGROUND

A mechanism in which two shaft bodies are connected together and caused to axially rotate has been used in various fields.

For example, Japanese Patent Application Publication No. Hei 10-257815 (the '815 Publication) discloses a vehicle speed detector for a grass mowing machine. In this vehicle speed detector, a rotary shaft is connected to an output shaft of a hydraulic motor, and a rotational speed detection gear is mounted to a distal end of said rotary shaft so as to be rotatable integrally therewith. A rotational speed of the rotational speed detection gear is detected to determine a rotational speed of the output shaft of the hydraulic motor.

In order for two shaft bodies to be connected together so as to be rotatable integrally with each other, the two shaft bodies need to be firmly secured to each other so that rotation and runout between the two shaft bodies are appropriately prevented.

The anti-rotation function as described herein refers to preventing relative movement (displacement) between shaft bodies with respect to an axial rotation direction. Without such rotation being appropriately prevented, the two shaft bodies cannot axially rotate integrally with each other, so that there occurs trouble such as idle rotation. The anti-runout function, on the other hand, refers to preventing relative movement (displacement) between shaft bodies with respect to a direction perpendicular to a rotation axis. Without such runout being appropriately prevented, there occurs displacement between rotation axes of the two shaft bodies, so that the two shaft bodies cannot axially rotate integrally with each other.

In the above-mentioned vehicle speed detector of the '815 Publication, a screw portion is formed at an end portion of each of the output shaft and the rotary shaft, and the screw portions of the output shaft and the rotary shaft are engaged with each other, thus connecting the output shaft and the rotary shaft together. In performing such screw connection, a connection operation for appropriately engaging the screw portions with each other tends to become complicated. Furthermore, in a case where a force such as vibration is applied to a connection section where the output shaft and the rotary shaft are connected together, the engagement between the screw portions might be gradually loosened with time, resulting in disconnection therebetween. Moreover, preferably, a configuration for connecting the two shaft bodies together is formed in a simple and less costly manner.

SUMMARY

The present invention has been made in view of the above-mentioned circumstances, and an object of the present invention is to provide a connecting structure and a hydraulic drive device that are capable of simply and reliably connecting two shaft bodies together while appropriately preventing rotation and runout between the two shaft bodies.

One aspect of the present invention relates to a connecting structure including a first shaft body and a second shaft body connected together at respective end portions and provided so as to be rotatable integrally with each other about a rotation axis. Each of the first shaft body and the second shaft body includes an anti-runout support portion and an anti-rotation support portion. The anti-runout support portion of the first shaft body and the anti-runout support portion of the second shaft body are engaged with each other so as to restrict relative movement between the first shaft body and the second shaft body with respect to a radial direction perpendicular to a rotation axis direction. The anti-rotation support portion of the first shaft body and the anti-rotation support portion of the second shaft body are engaged with each other so as to restrict relative movement between the first shaft body and the second shaft body with respect to a rotation direction about the rotation axis.

It is possible that the end portion of the first shaft body has a first projection portion convexed with respect to the rotation axis direction and at least one first concave portion concaved with respect to the rotation axis direction, and the end portion of the second shaft body has a second projection portion convexed with respect to the rotation axis direction and at least one second concave portion concaved with respect to the rotation axis direction. The first projection portion and the second concave portion are engaged with each other to act as the anti-runout support portion of the first shaft body and the anti-runout support portion of the second shaft body, and one or more wall portions constituting the second concave portion support the first projection portion from outside with respect to the radial direction. The at least one second projection portion and the at least one first concave portion are engaged with each other to act as the anti-rotation support portion of the first shaft body and the anti-rotation support portion of the second shaft body. The at least one second projection portion has a projecting surface portion extending in the rotation axis direction, the at least one first concave portion being constituted by a wall portion having a concave wall surface portion extending in the rotation axis direction, the projecting surface portion and the concave wall surface portion facing each other.

It is possible that a plurality of first concave portions are provided, and a plurality of second projection portions are provided. The plurality of second projection portions are engaged with the plurality of first concave portions, respectively.

It is possible that two second projection portions are provided, and the projecting surface portion of one of the two second projection portions and the projecting surface portion of the other second projection portion are oriented opposite to each other.

The projecting surface portion of the at least one second projection portion may be a flat surface.

At least a part of a side wall surface of the first projection portion may form a circular arc in a cross section perpendicular to the rotation axis, the part being supported by the one or more wall portions constituting the second concave portion.

It is possible that each of the first projection portion and the second concave portion is provided in the rotation axis, the at least one first concave portion is provided at a position more distant than the first projection portion from the rotation axis, and the at least one second projection portion is provided at a position more distant than the second concave portion from the rotation axis.

The at least one second projection portion may extend from the one or more wall portions constituting the second concave portion.

The second concave portion may surround the first projection portion with respect to the radial direction.

The second concave portion may be provided adjacently to the at least one second projection portion with respect to the radial direction.

The at least one first concave portion may be constituted by a cutout portion of the first shaft body.

It is possible that the first projection portion is provided in the rotation axis and disposed in the second concave portion so as to project from a first reference surface with respect to the rotation axis direction, the first reference surface being formed on the end portion of the first shaft body. A plurality of first concave portions are provided at such positions as to sandwich the first projection portion therebetween with respect to the radial direction, and each of the plurality of first concave portions is recessed from the first reference surface with respect to the rotation axis direction. The second concave portion is provided in the rotation axis and recessed from a second reference surface with respect to the rotation axis direction, the second reference surface being formed on the end portion of the second shaft body. The same number of second projection portions as the number of the plurality of first concave portions are provided at positions outward of the second concave portion with respect to the radial direction and disposed in the plurality of first concave portions so as to project from the second reference surface with respect to the rotation axis direction.

Another aspect of the present invention relates to a hydraulic drive device including a hydraulic motor and the above-described connecting structure. One of the first shaft body and the second shaft body of the connecting structure is an output shaft of the hydraulic motor.

It is possible that the hydraulic drive device further includes a rotation sensor for determining a rotational speed of the output shaft, and the rotation sensor determines the rotational speed of the output shaft by measuring a rotational speed of the other of the first shaft body and the second shaft body.

Advantages

According to the present invention, it is possible to simply and reliably connect two shaft bodies together while appropriately preventing rotation and runout between the two shaft bodies.

DESCRIPTION OF THE PREFERRED EMBODIMENTS

With reference to the appended drawings, the following describes one embodiment of the present invention.

Figure 1:
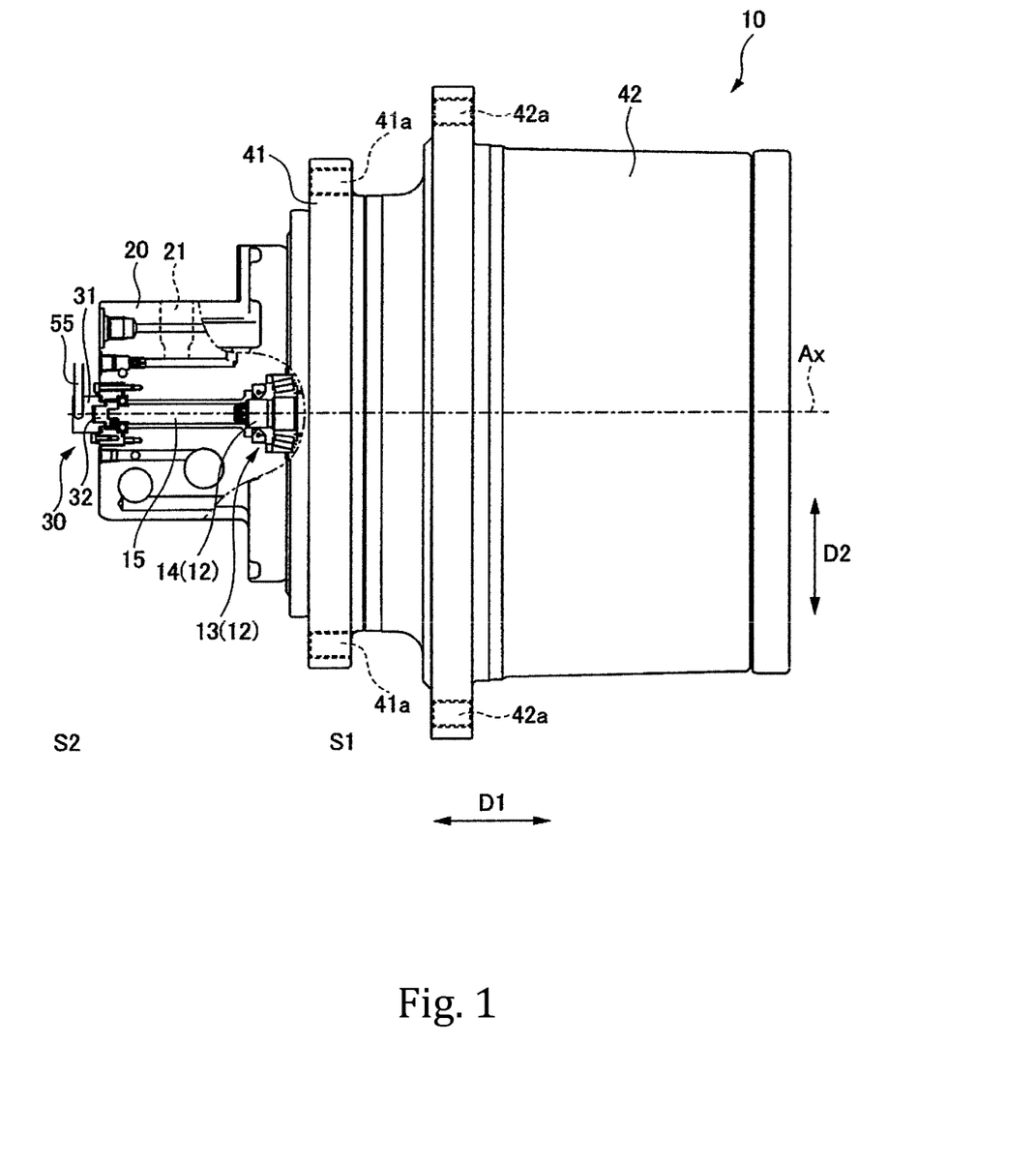
FIG. 1 is a view showing one example of a hydraulic drive device.

FIG. 1 is a view showing one example of a hydraulic drive device 10. For easier understanding, FIG. 1 shows an external appearance state of a body case 41 and a rotary case 42 and illustrates a device configuration in a hydraulic block 20.

The hydraulic drive device 10 includes a hydraulic motor 12, the hydraulic block 20, and a rotation sensor 30.

The hydraulic motor 12 can adopt any configuration in which the hydraulic motor 12 is driven using a hydraulic oil (namely, a pressure oil) supplied from an unillustrated hydraulic source and generates a rotational output. Typically, a gear motor, a vane motor, or a plunger motor can be used as the hydraulic motor 12. The hydraulic motor 12 of this embodiment is configured by an axial-type plunger motor and may have a configuration similar to that of the hydraulic motor disclosed by the '815 Publication.

The hydraulic motor 12 includes a body 13 and an output shaft 14. The body 13 is disposed inside each of the body case 41 and the rotary case 42, and the output shaft 14 extends out from the body 13 in a rotation axis direction D1 and axially rotates.

The body 13 of the hydraulic motor 12 is disposed on one side S1 of the hydraulic block 20 (a right side in FIG. 1) with respect to the rotation axis direction D1. The rotation sensor 30 is disposed on the other side S2 of the hydraulic block 20 (a left side in FIG. 1) with respect to the rotation axis direction D1. The body 13 of the hydraulic motor 12 as a whole is disposed inside the body case 41 and the rotary case 42, and only part of the body 13 is illustrated in FIG. 1.

A connection shaft 15 is connected to the output shaft 14 of the hydraulic motor 12. The output shaft 14 and the connection shaft 15 axially rotate integrally with each other about a rotation axis Ax. The connection shaft 15 is disposed more distantly than the output shaft 14 from the body 13 of the hydraulic motor 12 and provided so as to penetrate through the hydraulic block 20.

Figure 2:
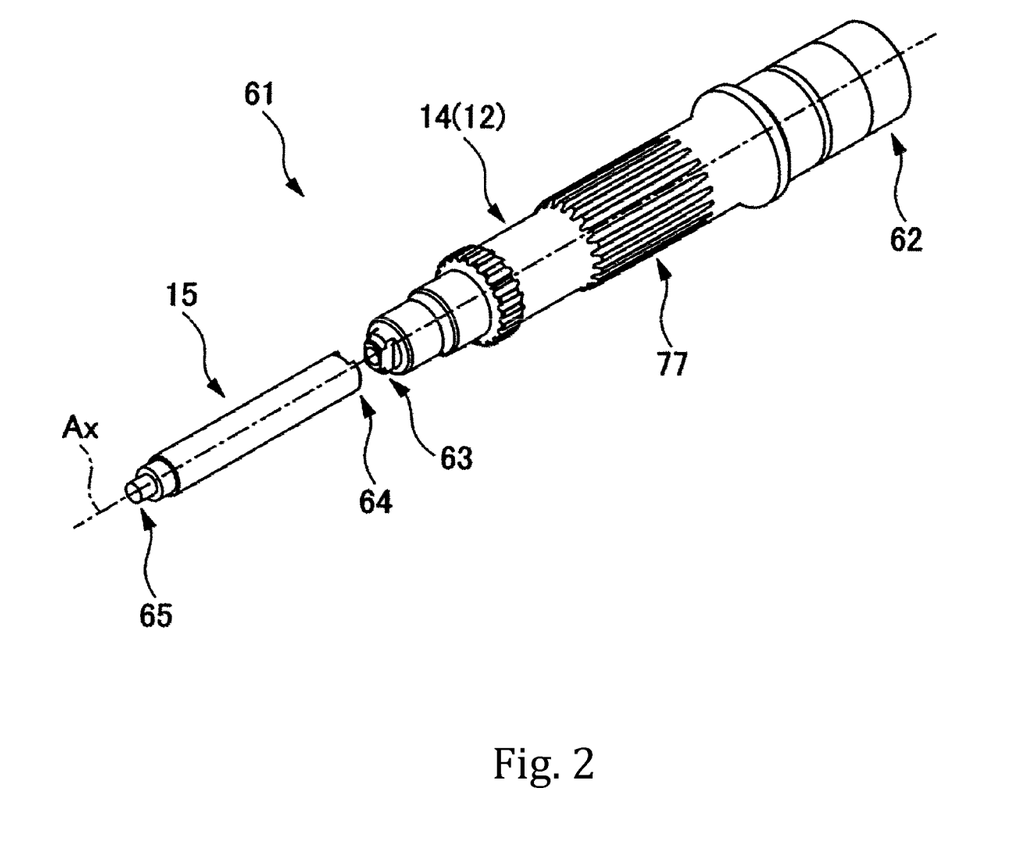
FIG. 2 is an exploded perspective view showing only an output shaft and a connection shaft.
Figure 3:
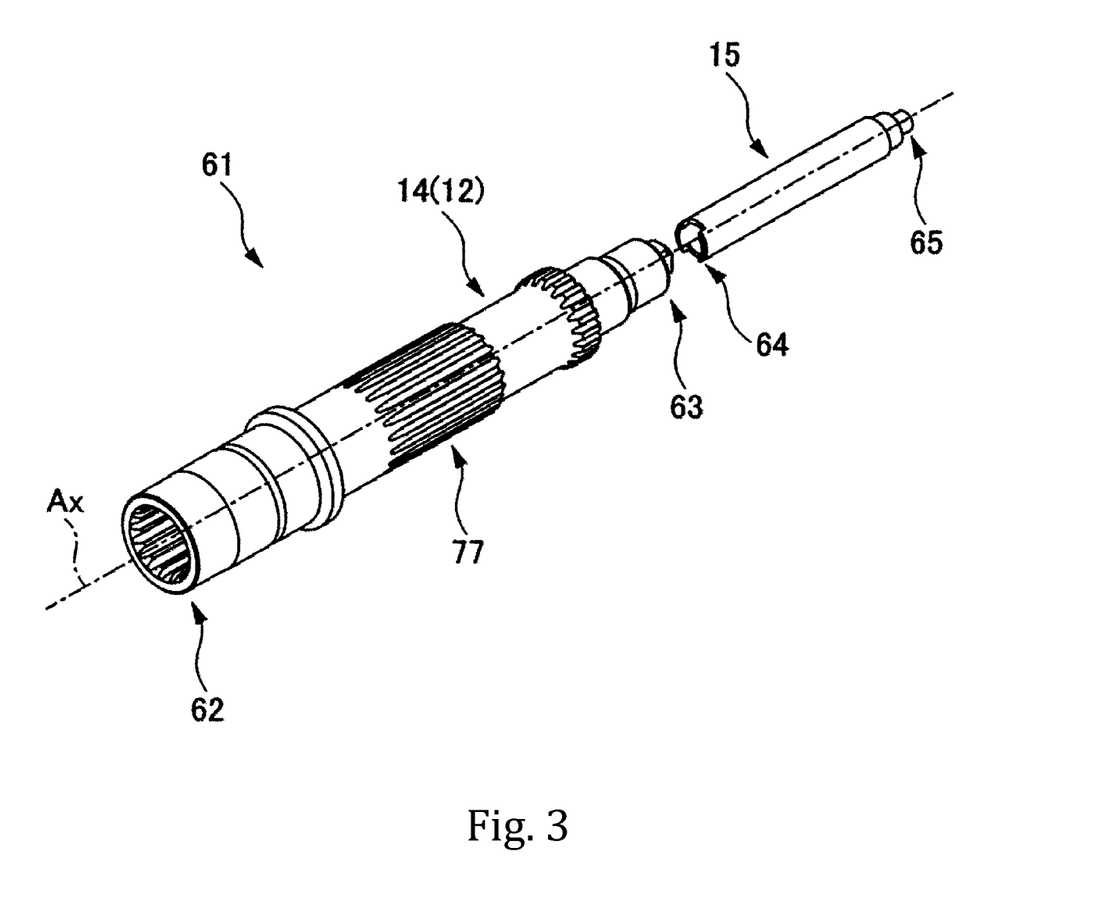
FIG. 3 is an exploded perspective view of the output shaft and the connection shaft shown in FIG. 2 as seen from a different direction.

The output shaft 14 is connected to a cylinder block (unillustrated) of the hydraulic motor 12 via a spline connection portion (see a reference character "77" in FIG. 2) and outputs rotational power. Also inside the body case 41 and the rotary case 42, the output shaft 14 extends on the rotary axis Ax in the rotary axis direction D1, and an output shaft (hereinafter, referred to also as a "second output shaft," unillustrated) different from the output shaft 14 (hereinafter, referred to also as a "first output shaft") shown in FIG. 2 and FIG. 3 is further provided. The second output shaft is disposed inside the rotary case 42. The first output shaft and the second output shaft both extend in the rotation axis direction D1, connected to each other, and are provided so as to be axially rotatable integrally with each other about the common rotation axis Ax. The first output shaft and the second output shaft, however, extend out from the body 13 toward opposite directions to each other with respect to the rotation axis direction D1, with the first output shaft (namely, the output shaft 14) projecting from the body 13 toward the left side in FIG. 1 and the second output shaft projecting from the body 13 toward the right side in FIG. 1. A rotational output of the second output shaft is transmitted to the rotary case 42 via a speed reducer (unillustrated) provided in the rotary case 42. This causes the rotary case 42 to axially rotate about the rotation axis Ax. In an external connection portion 42a, the rotary case 42 is connected to an endless track crawler via a sprocket (unillustrated), and said crawler is driven to rotate through axial rotation of the rotary case 42. The hydraulic motor 12, however, may include a single output shaft instead of the first output shaft and the second output shaft mentioned above.

The body case 41 is connected to a securing member (for example, a track frame) such as a frame of a travel machine via an external connection portion 41a, provided separately from the rotary case 42, and does not axially rotate. The body 13 of the hydraulic motor 12 and the hydraulic block 20 are connected to the body case 41, and the body case 41 securely supports the body 13 of the hydraulic motor 12 and the hydraulic block 20.

In the hydraulic block 20, there are formed a plurality of oil passages 21 connected to the hydraulic motor 12. A hydraulic oil used to drive the hydraulic motor 12 is caused to flow through the oil passages 21. For example, in the hydraulic block 20, there are formed an oil passage 21 for supplying a hydraulic oil from the hydraulic source (unillustrated) to the hydraulic motor 12 and an oil passage 21 for discharging the hydraulic oil from the hydraulic motor 12.

The rotation sensor 30 determines a rotational speed of the output shaft 14 that rotates integrally with the connection shaft 15 by measuring a rotational speed of the connection shaft 15. As mentioned above, the output shaft 14 rotates in conjunction with rotation of the crawler connected to the hydraulic drive device 10 (the rotary case 42 in this embodiment). Therefore, the rotation sensor 30 can detect a rotational speed of the crawler by determining a rotational speed of the output shaft 14, thus functioning as a sensor for determining a traveling speed of a travel machine such as a work machine provided with said crawler.

While there is no particular limitation on a specific configuration of the rotation sensor 30, the rotation sensor 30 shown in FIG. 1 includes a rotary portion 32 and a detection portion 31 for measuring a rotational speed of said rotary portion 32. The rotary portion 32 is connected to an end portion of the connection shaft 15 and axially rotates together with the connection shaft 15. The detection portion 31 is connected to a controller (unillustrated) via a wiring portion 55 and transmits a measurement result to the controller. There is no particular limitation on how the detection portion 31 measures a rotational speed of the rotary portion 32. For example, as described in the '815 Publication, the detection portion 31 configured by an electromagnetic pickup mechanism sequentially detects a plurality of teeth formed on an outer peripheral surface of the rotary portion 32, thus being able to measure a rotational speed of the rotary portion 32. The rotation sensor 30 makes the detection portion 31 measure a rotational speed of the rotary portion 32 and thus determines a rotational speed of the connection shaft 15.

Next, a description is given of a connection structure between the output shaft 14 and the connection shaft 15.

FIG. 2 is an exploded perspective view showing only the output shaft 14 and the connection shaft 15. FIG. 3 is an exploded perspective view of the output shaft 14 and the connection shaft 15 shown in FIG. 2 as seen from a different direction.

In a connecting structure 61 shown in FIG. 2 and FIG. 3, one of two shaft bodies connected to each other is the output shaft 14 of the hydraulic motor 12 and the other is the connection shaft 15 to which the rotary portion 32 of the rotation sensor 30 is connected. The output shaft 14 and the connection shaft 15 are connected to each other at their respective end portions and are provided so as to be rotatable integrally with each other about the rotation axis Ax. In FIG. 2 and FIG. 3, one end portion 62 of the output shaft 14 is disposed in the rotary case 42 (see FIG. 1), and the other end portion 63 of the output shaft 14 is connected to one end portion 64 of the connection shaft 15. Furthermore, the rotary portion 32 of the rotary sensor 30 is connected to the other end portion 65 of the connection shaft 15.

In this embodiment, the end portion 63 of the output shaft 14 is engaged with the end portion 64 of the connection shaft 15, and thus the output shaft 14 and the connection shaft 15 are connected together.

Figure 4:
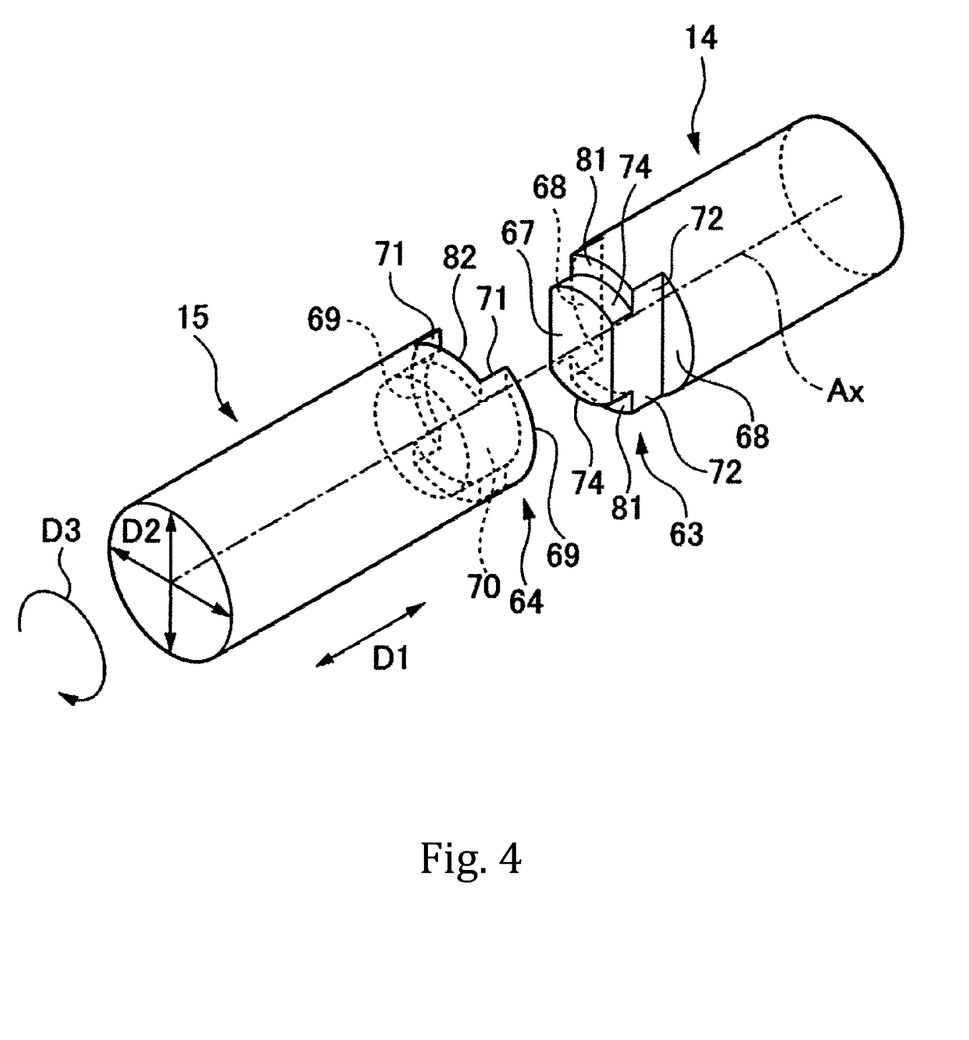
FIG. 4 is an exploded perspective view showing a vicinity of an end portion of the output shaft and a vicinity of an end portion of the connection shaft shown in FIG. 2 and FIG. 3 in a simplified and enlarged form.
Figure 5:
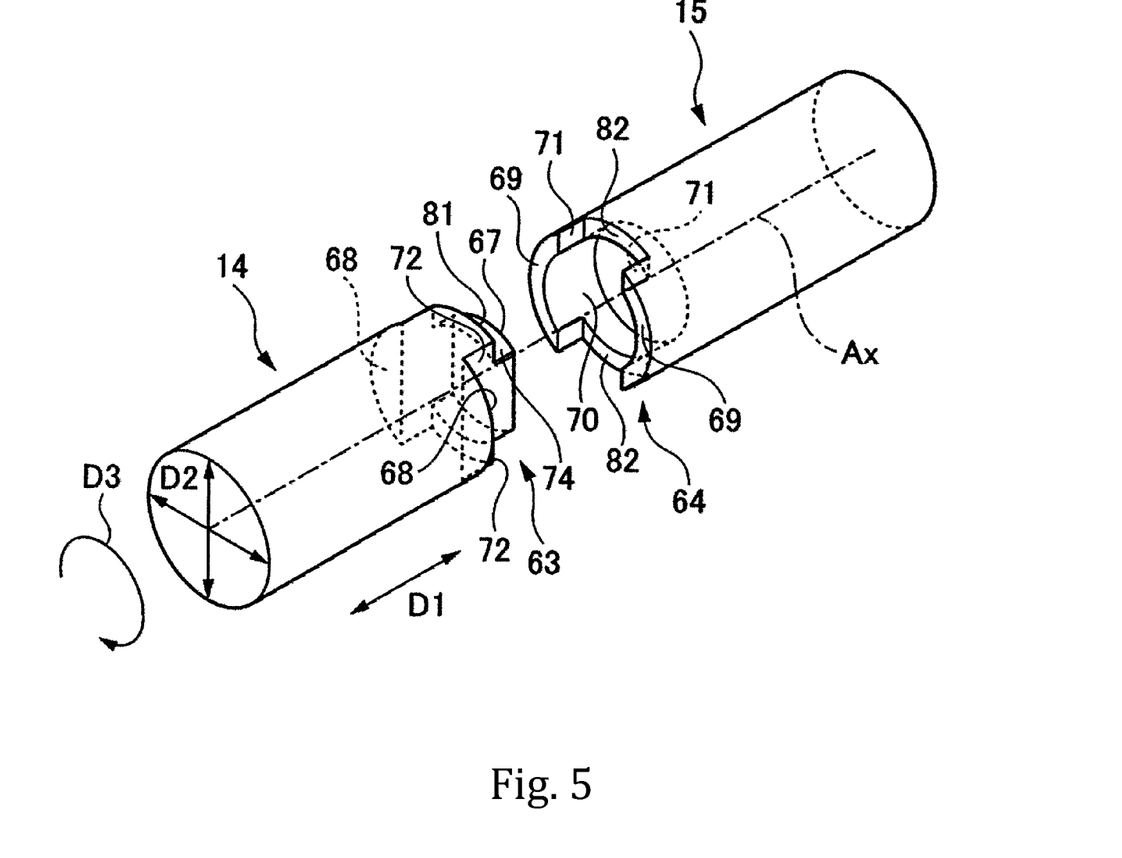
FIG. 5 is an exploded perspective view of the vicinity of the end portion of the output shaft and the vicinity of the end portion of the connection shaft shown in FIG. 4 as seen from a different direction.
Figure 6:
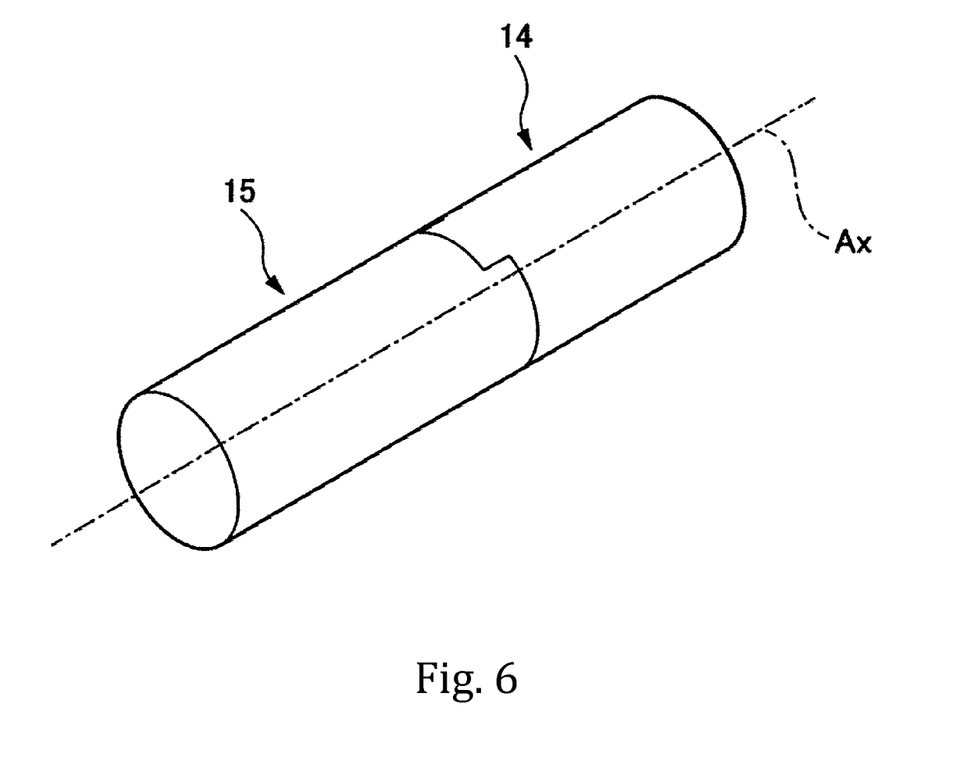
FIG. 6 is a perspective view showing, in an enlarged form, the vicinity of the end portion of the output shaft and the vicinity of the end portion of the connection shaft in a state where the output shaft and the connection shaft are connected together.

FIG. 4 is an exploded perspective view showing a vicinity of the end portion 63 of the output shaft 14 and a vicinity of the end portion 64 of the connection shaft 15 shown in FIG. 2 and FIG. 3 in a simplified and enlarged form. FIG. 5 is an exploded perspective view of the vicinity of the end portion 63 of the output shaft 14 and the vicinity of the end portion 64 of the connection shaft 15 shown in FIG. 4 as seen from a different direction. FIG. 6 is a perspective view showing, in an enlarged form, the vicinity of the end portion 63 of the output shaft 14 and the vicinity of the end portion 64 of the connection shaft 15 in a state where the output shaft 14 and the connection shaft 15 are connected together.

Each of the output shaft 14 and the connection shaft 15 of this embodiment has an anti-runout support portion and an anti-rotation support portion. The anti-runout support portion of the output shaft 14 (see an after-mentioned first projection portion 67) and the anti-runout support portion of the connection shaft 15 (see an after-mentioned second concave portion 70) are engaged with each other so as to restrict relative movement between the output shaft 14 and the connection shaft 15 with respect to a radial direction D2 perpendicular to the rotation axis direction D1. On the other hand, the anti-rotation support portion of the output shaft 14 (see an after-mentioned first concave portion 68) and the anti-rotation support portion of the connection shaft 15 (see an after-mentioned second projection portion 69) are engaged with each other so as to restrict relative movement between the output shaft 14 and the connection shaft 15 with respect to a rotation direction D3 about the rotation axis Ax.

The end portion 63 of the output shaft 14 has the first projection portion 67 convexed with respect to the rotation axis direction D1 and the first concave portion 68 concaved with respect to the rotation axis direction D1. Being convexed as described herein refers to a state of projecting in such a direction as to approach the connection shaft 15, and being concaved refers to a state of being recessed in such a direction as to be separated from the connection shaft 15. In this embodiment, only one first projection portion 67 is provided and disposed on the rotation axis Ax. The first projection portion 67 projects from a first reference surface 81 with respect to the rotation axis direction D1, the first reference surface 81 being formed on the end portion 63 of the output shaft 14. In a state where the output shaft 14 and the connection shaft 15 are engaged with each other, the first projection portion 67 is disposed in the second concave portion 70 formed in the connection shaft 15. At least a part 74 of a side wall surface of the first projection portion 67, the part being supported by a wall portion constituting the second concave portion 70, forms a circular arc about the rotation axis Ax in a cross section perpendicular to the rotation axis Ax and fits on a wall surface of the second concave portion 70 extending in a circumferential direction about the rotation axis Ax. The output shaft 14 shown in FIG. 4 and FIG. 5 is provided with two parts 43 supported by the wall portion constituting the second concave portion 70, and the two parts 74 are disposed at two-fold symmetrical positions relative to the rotation axis Ax as a center axis.

A plurality of (in FIG. 4 and FIG. 5, two) first concave portions 68 are provided and disposed at positions more distant than the first projection portion 67 from the rotation axis Ax with respect to the radial direction D2. The plurality of first concave portions 68 are provided at such positions as to sandwich the first projection portion 67 therebetween with respect to the radial direction D2. Each of the first concave portions 68 is recessed from the first reference surface 81 with respect to the rotation axis direction D1. The first concave portions 68 of this embodiment are each constituted by a cutout portion formed by cutting part of the output shaft 14.

On the other hand, the end portion 64 of the connection shaft 15 has the second projection portion 69 convexed with respect to the rotation axis direction D1 and the second concave portion 70 concaved with respect to the rotation axis direction D1. Being convexed as described herein refers to a state of projecting in such a direction as to approach the output shaft 14, and being concaved refers to a state of being recessed in such a direction as to be separated from the output shaft 14. A plurality of (in FIG. 4 and FIG. 5, two) second projection portions 69 are provided and disposed at positions more distant than the second concave portion 70 from the rotation axis Ax with respect to the radial direction D2. That is, the same number of second projection portions 69 as the number of the first concave portions 68 are provided at positions outward of the second concave portion 70 with respect to the radial direction D2. The two second projection portions 69 extend in the rotation axis direction D1 from the wall portion constituting the second concave portion 70 and project in the rotation axis direction D1 from a second reference surface 82 formed on the end portion 64 of the connection shaft 15. In a state where the output shaft 14 and the connection shaft 15 are engaged with each other, the two second projection portions 69 are each disposed in a corresponding one of the first concave portions 68.

Only one second concave portion 70 is provided as a circular columnar space and disposed on the rotation axis Ax. The second concave portion 70 is provided adjacently to the second projection portions 69 with respect to the radial direction D2 and recessed from the second reference surface 82 with respect to the rotation axis direction D1. A diameter of the second concave portion 70 with respect to the radial direction D2 is equal to or somewhat larger than a maximum diameter of the first projection portion 67 with respect to the radial direction D2 (in this embodiment, a diameter of the first projection portion 67 between the parts 74 supported by the wall surface of the second concave portion 70). Accordingly, in a state where the output shaft 14 and the connection shaft 15 are engaged with each other, the wall portion constituting the second concave portion 70 surrounds the first projection portion 67 with respect to the radial direction D2.

Further, the second projection portions 69 each have a projecting surface portion 71 extending in the rotation axis direction D1, and a wall portion constituting each of the first concave portions 68 has a wall surface portion 72 extending in the rotation axis direction D1, the projecting surface portion 71 and the wall surface portion 72 facing each other. The projecting surface portion 71 of one of the two second projection portions 69 and the projecting surface portion 71 of the other second projection portion 69 are oriented opposite to each other, and these projecting surface portions 71 form flat surfaces extending parallel to each other. In a space between these projecting surface portions 71, part of the output shaft 14 constituting part of the wall portion of each of the first concave portions 68 is disposed, and said part of the output shaft 14 forms the wall surface portion 72 facing the projecting surface portion 71. The wall portions constituting the two first concave portions 68, respectively, form flat surfaces extending parallel to each other and extend parallel also to the projecting surface portions 71.

In the output shaft 14 and the connection shaft 15 having the above mentioned configuration, the first projection portion 67 of the output shaft 14 and the second concave portion 70 of the connection shaft 15 are engaged with each other and function as the anti-runout support portions. That is, one or more wall portions (in FIG. 4 and FIG. 5, a single wall portion) constituting the second concave portion 70 support the first projection portion 67 from outside with respect to the radial direction D2. With this configuration, the wall portion constituting the second concave portion 70 inhibits movement of the first projection portion 67 in the radial direction D2, thus preventing runout between the output shaft 14 and the connection shaft 15. On the other hand, each of the second projection portions 69 of the connection shaft 15 and a corresponding one of the first concave portions 68 of the output shaft 14 are engaged with each other and function as the anti-rotation support portions. That is, the two second projection portions 69 are engaged with the two first concave portions 68, respectively. With this configuration, the projecting surface portions 71 of the second projection portions 69 come in contact with the wall surface portions 72 of the first concave portions 68, respectively, thus preventing rotation between the output shaft 14 and the connection shaft 15.

As discussed above, according to the hydraulic drive device 10 and the connecting structure 61 of this embodiment, it is possible to simply and reliably connect two shaft bodies (namely, the output shaft 14 and the connection shaft 15) together while appropriately preventing rotation and runout between the two shaft bodies.

Particularly in the connecting structure 61 of this embodiment, simply by fitting the connection shaft 15 into engagement with the output shaft 14 with respect to the rotation axis direction D1, the output shaft 14 and the connection shaft 15 can be engaged with each other, and thus assembly by connecting the output shaft 14 and the connection shaft 15 together can be facilitated. Furthermore, the output shaft 14 and the connection shaft 15 are connected together without the need for another member such as a pin. Thus, a connection operation is prevented from becoming complicated, and a cost reduction can also be achieved. Furthermore, fitting between a projection portion and a concave portion is used to connect the output shaft 14 and the connection shaft 15 together, and thus even when an external force such as vibration is applied to a connection section where the output shaft 14 and the connection shaft 15 are connected together, there is no fear that engagement between the output shaft 14 and the connection shaft 15 will be loosened, thus providing high reliability of connection between the output shaft 14 and the connection shaft 15.

Furthermore, since the first concave portions 68 are formed to have a cutout structure, a process of forming the first concave portions 68 is facilitated, and a manufacturing cost can be reduced.

The present invention is not limited to the foregoing embodiment and modification examples but may include various aspects modified variously as could be conceived by those skilled in the art, and the effects provided by the present invention are also not limited to those mentioned above. Accordingly, addition, modification, and partial deletion of the elements recited in the claims or described in the specification can be variously made within the technical idea and the purport of the present invention.

For example, while in the foregoing embodiment, the output shaft 14 has the first projection portion 67 and the first concave portions 68 and the connection shaft 15 has the second projection portions 69 and the second concave portion 70, it is possible that the output shaft 14 has the second projection portions 69 and the second concave portion 70 and the connection shaft 15 has the first projection portion 67 and the first concave portions 68.

Furthermore, while in the foregoing embodiment, the output shaft 14 of the hydraulic motor 12 and the connection shaft 15 to which the rotation sensor 30 is mounted are used as examples of the two shaft bodies (namely, the first shaft body and the second shaft body), the above-mentioned engagement structure can be favorably used also to connect together a first shaft body and a second shaft body that have other purposes and functions.

What is claimed is:

1. A connecting structure, comprising:
a first shaft body; and
a second shaft body,
the first shaft body and the second shaft body being connected to each other at respective end portions and provided so as to be rotatable integrally with each other about a rotation axis,
wherein each of the first shaft body and the second shaft body includes:
an anti-runout support portion; and
anti-rotation support portion,
wherein the anti-runout support portion of the first shaft body and the anti-runout support portion of the second shaft body are engaged with each other so as to restrict relative movement between the first shaft body and the second shaft body with respect to a radial direction perpendicular to a rotation axis direction, and
wherein the anti-rotation support portion of the first shaft body and the anti-rotation support portion of the second shaft body are engaged with each other so as to restrict relative movement between the first shaft body and the second shaft body with respect to a rotation direction about the rotation axis,
wherein the end portion of the first shaft body has:
a first projection portion convexed with respect to the rotation axis direction; and
at least one first concave portion concaved with respect to the rotation axis direction,
wherein the end portion of the second shaft body has:
at least one second projection portion convexed with respect to the rotation axis direction; and
a second concave portion concaved with respect to the rotation axis direction,
wherein the first projection portion and the second concave portion are engaged with each other to act as the anti-runout support portion of the first shaft body and the anti-runout support portion of the second shaft body, and one or more wall portions constituting the second concave portion support the first projection portion from outside with respect to the radial direction,
wherein the at least one second projection portion and the at least one first concave portion are engaged with each other to act as the anti-rotation support portion of the first shaft body and the anti-rotation support portion of the second shaft body, and the at least one second projection portion has a projecting surface portion extending in the rotation axis direction, the at least one first concave portion being constituted by a wall portion having a wall surface portion extending in the rotation axis direction, the projecting surface portion and the wall surface portion facing each other,
wherein the at least one second projection portion extends from the one or more wall portions constituting the second concave portion, and
wherein the first projection portion includes a side wall that is substantially flush with the wall surface portion.

2. The connecting structure according to claim 1, wherein the at least one first concave portion comprises a plurality of first concave portions,
wherein the at least one second projection portion comprises a plurality of second projection portions, and
wherein the plurality of second projection portions are engaged with the plurality of first concave portions, respectively.

3. The connecting structure according to claim 2, wherein the plurality of second projection portions comprises two second projection portions, and
wherein the projecting surface portion of one of the two second projection portions and the projecting surface portion of the other second projection portion are oriented opposite to each other.

4. The connecting structure according to claim 1, wherein the projecting surface portion of the at least one second projection portion is a flat surface.

5. The connecting structure according to claim 1, wherein at least a part of a side wall surface of the first projection portion forms a circular arc in a cross section perpendicular to the rotation axis, the part being supported by the one or more wall portions constituting the second concave portion.

6. The connecting structure according to claim 1, wherein each of the first projection portion and the second concave portion is provided in the rotation axis,
wherein the at least one first concave portion is provided at a position more distant than the first projection portion from the rotation axis, and
wherein the at least one second projection portion is provided at a position more distant than the second concave portion from the rotation axis.

7. The connecting structure according to claim 1, wherein the second concave portion surrounds the first projection portion with respect to the radial direction.

8. The connecting structure according to claim 1, wherein the second concave portion is provided adjacently to the at least one second projection portion with respect to the radial direction.

9. The connecting structure according to claim 1, wherein the at least one first concave portion is constituted by a cutout portion of the first shaft body.

10. The connecting structure according to claim 1, wherein the first projection portion is provided in the rotation axis and disposed in the second concave portion so as to project from a first reference surface with respect to the rotation axis direction, the first reference surface being formed on the end portion of the first shaft body, wherein the at least one first concave portion comprises a plurality of first concave portions, the plurality of first concave portions being provided at such positions as to sandwich the first projection portion therebetween with respect to the radial direction, and each of the plurality of first concave portions is recessed from the first reference surface with respect to the rotation axis direction, wherein the second concave portion is provided in the rotation axis and recessed from a second reference surface with respect to the rotation axis direction, the second reference surface being formed on the end portion of the second shaft body, and wherein the at least one second projection portion comprises a same number of second projection portions as a number of the plurality of first concave portions, the same number of second projection portions being provided at positions outward of the second concave portion with respect to the radial direction and disposed in the plurality of first concave portions so as to project from the second reference surface with respect to the rotation axis direction.

11. A hydraulic drive device, comprising:
a hydraulic motor; and
the connecting structure according to claim 1,
wherein one of the first shaft body and the second shaft body of the connecting structure is an output shaft of the hydraulic motor.

12. The hydraulic drive device according to claim 11, further comprising:
a rotation sensor for determining a rotational speed of the output shaft,
wherein the rotation sensor is configured to determine the rotational speed of the output shaft by measuring a rotational speed of the other of the first shaft body and the second shaft body.

13. The connecting structure according to claim 1, wherein the second concave portion is provided adjacently to the at least one second projection portion with respect to the radial direction.

14. The connecting structure according to claim 1, wherein the first projection portion includes a non-circular cross-section.

15. The connecting structure according to claim 1, wherein the at least one second projection portion has uniform wall thickness.

16. The connecting structure according to claim 1, wherein the at least one second projection portion has arcuate inner and outer surfaces.

17. A connecting structure, comprising:
a first shaft body; and
a second shaft body,
the first shaft body and the second shaft body being connected to each other at respective end portions and provided so as to be rotatable integrally with each other about a rotation axis, wherein each of the first shaft body and the second shaft body includes:
an anti-runout support portion; and
anti-rotation support portion, wherein the anti-runout support portion of the first shaft body and the anti-runout support portion of the second shaft body are engaged with each other so as to restrict relative movement between the first shaft body and the second shaft body with respect to a radial direction perpendicular to a rotation axis direction, and wherein the anti-rotation support portion of the first shaft body and the anti-rotation support portion of the second shaft body are engaged with each other so as to restrict relative movement between the first shaft body and the second shaft body with respect to a rotation direction about the rotation axis, wherein the end portion of the first shaft body has:
a first projection portion convexed with respect to the rotation axis direction; and
at least one first concave portion concaved with respect to the rotation axis direction, wherein the end portion of the second shaft body has:
at least one second projection portion convexed with respect to the rotation axis direction; and
a second concave portion concaved with respect to the rotation axis direction, wherein the first projection portion and the second concave portion are engaged with each other to act as the anti-runout support portion of the first shaft body and the anti-runout support portion of the second shaft body, and one or more wall portions constituting the second concave portion support the first projection portion from outside with respect to the radial direction, wherein the at least one second projection portion and the at least one first concave portion are engaged with each other to act as the anti-rotation support portion of the first shaft body and the anti-rotation support portion of the second shaft body, and the at least one second projection portion has a projecting surface portion extending in the rotation axis direction, the at least one first concave portion being constituted by a wall portion having a flat wall surface portion extending in the rotation axis direction, the projecting surface portion and the flat wall surface portion facing each other, wherein the at least one second projection portion extends from the one or more wall portions constituting the second concave portion, and wherein the first projection portion includes the flat surface extending along the rotation axis.

* * * * *